United States Patent [19]

Patterson

[11] Patent Number: 5,898,375

[45] Date of Patent: Apr. 27, 1999

[54] SIPHON ALARM AND RESTARTING MECHANISM

[75] Inventor: Donald J. Patterson, Steamboat Springs, Colo.

[73] Assignee: Fluid Dynamic Siphons, Inc., Steamboat Springs, Colo.

[21] Appl. No.: 08/905,703

[22] Filed: Aug. 4, 1997

Related U.S. Application Data

[XX .
[60] Provisional application No. 60/039,146, Feb. 24, 1997.

[51] Int. Cl.$^6$ ................................................. G08B 21/00
[52] U.S. Cl. ........................ 340/612; 340/610; 340/618; 137/124; 137/139; 137/551; 200/81.9 R
[58] Field of Search ....................... 340/612, 614, 340/616, 618, 624, 625, 309.15, 610; 73/226; 137/87.03, 124, 129, 132, 137, 136, 138, 143, 139, 140, 551; 210/117, 140, 174, 195.3, 85, 87; 368/109, 244, 249, 252

[56] References Cited

U.S. PATENT DOCUMENTS

| | | | |
|---|---|---|---|
| 373,885 | 11/1887 | Cuntz | 137/139 |
| 818,875 | 4/1906 | Hunt | 137/139 |
| 847,592 | 3/1907 | Miller | 137/139 |
| 848,696 | 4/1907 | Shields | 137/139 |
| 871,427 | 11/1907 | Miller | 137/139 |
| 3,797,513 | 3/1974 | Hazen | 137/132 |
| 3,881,506 | 5/1975 | Hazen | 137/137 |
| 4,020,488 | 4/1977 | Martin et al. | |
| 4,143,255 | 3/1979 | Herscovitz | 200/81.9 M |
| 4,249,559 | 2/1981 | George | 137/124 |
| 4,254,934 | 3/1981 | Amici | 251/61.1 |
| 4,282,413 | 8/1981 | Simons et al. | 200/81.9 M |
| 4,319,601 | 3/1982 | George | 137/124 |
| 4,439,323 | 3/1984 | Ball | 210/608 |
| 4,625,752 | 12/1986 | George | 137/124 |
| 4,906,807 | 3/1990 | Siebert et al. | 200/81.9 M |
| 4,999,117 | 3/1991 | Palmu et al. | 210/744 |
| 5,021,619 | 6/1991 | Hutchinson | 200/81.9 M |
| 5,183,983 | 2/1993 | Knop | 200/81.9 M |
| 5,263,370 | 11/1993 | Murata et al. | 73/226 |
| 5,273,067 | 12/1993 | Andersson et al. | 137/129 |
| 5,358,000 | 10/1994 | O'Hair | 137/124 |
| 5,480,561 | 1/1996 | Ball et al. | 210/744 |
| 5,483,830 | 1/1996 | Dietz et al. | 73/226 |
| 5,587,065 | 12/1996 | Burns | 210/104 |

*Primary Examiner*—Jeffery A. Hofsass
*Assistant Examiner*—Toan N. Pham
*Attorney, Agent, or Firm*—Pittenger & Smith, P.C.

[57] ABSTRACT

The invention includes a system for monitoring the performance of an automatic dosing siphon utilized in reservoir which is a part of a wastewater treatment system. The siphon includes a bell type cover, a fluid trap having one leg extending upward into the bell, and an outlet discharge pipe connected to said trap. A flow detect switch is located in the discharge pipe. Upon siphon activation the switch is opened and a countdown timer is reset. After draining the reservoir, the switch closes and the timer starts counting down a predetermined time period. If the siphon doesn't activate, time expires and an alarm is triggered. A second system utilizes a solenoid drain valve located above the outlet portion of the siphon trap such that upon time expiring the valve opens, the tank drains, and the timer resets. The valve automatically reprimes the siphon. The system continues to monitor the siphon and initiates an alarm upon subsequent siphon failures. Another system for restarting the siphon replaces the solenoid valve with an air pump whose air hose is situated under the siphon bell. Upon time expiring, the air pump activates and pumps air under the siphon bell thereby activating the siphon. The tank drains, the switch closes, and the siphon is reprimed for normal operations. A second timer counts down after the activation of the air pump or solenoid valve. If the switch is not opened within the second predetermined time period, an alarm is triggered.

27 Claims, 6 Drawing Sheets

Fig-1

Fig_3

Fig_4

Fig_2

SIPHON ALARM AND RESTARTING MECHANISM

This application claims the benefit of U.S. Provisional patent application Ser. No. 60/039,146, filed Feb. 24, 1997 which is co-pending.

FIELD OF INVENTION

The present invention is in the field of wastewater treatment systems which utilize siphons. It is more specifically directed to a sewage or wastewater treatment system which uses a siphon to automatically drain storage tanks and reservoirs and restart the siphon when failure occurs in the treatment system.

BACKGROUND OF THE INVENTION

An automatic dosing siphon is a device that allows effluent to be stored in a sewage treatment tank until a pre-determined level is reached. At which time the siphon is activated, the tank is drained to the low water line, the siphon is deactivated, and the tank begins refilling. Automatic dosing siphons contain no moving parts or electrical devices and have been used for on-site sewage treatment to dose a leach field or sand filter.

Although the siphon is extremely simple, and very reliable it is still subject to failure. For example, siphon failures can be caused by heavy inflows into the siphon tank just as the siphon is reaching the end of its cycle. The siphon takes a "gulp" of air which is insufficient to break the siphon and the siphon fails and begins to trickle. Siphon failures are usually one-time events which are normally detected years after the siphon actually failed by a catastrophic failure of the entire sewage treatment system.

Until this invention there has not been an effective method of monitoring siphon performance. Previous methods have included high level water alarms, where a float switch is placed above the high water level, and an alarm is triggered if the water reaches the level of the float switch. This method has proven ineffective because most siphon failures result in water trickling through the siphon before the high water level is reached.

Another method utilizes cycle counters, whereby a digital counter is incremented every time the siphon is activated. If the the counter stops incrementing, a siphon failure is indicated. For this method of monitoring siphon performance, someone must periodically check the counter. Experience has shown that homeowners will not remember to check the counter.

Due to the fact that effective siphon performance monitoring systems did not exist prior to this invention, and because numerous devices exist to monitor pump performance, engineers will often specify that pumps be installed instead of automatic siphons. This invention will eliminate the need for pumps by providing reliable siphon performance monitoring. Additionally, the present invention will provide an automated means of restarting a one-time siphon failure.

INFORMATION DISCLOSURE STATEMENT

The following information is provided in compliance with the inventor's duty to disclose all pertinent information which is relevant to the information which is the subject of this application. The listed patents are known to the applicant and are believed to be pertinent to the examination of this application.

The Palmu patent (U.S. Pat. No. 4,999,117) discloses a method for monitoring the performance and output of a wastewater pump station. This invention encompasses measuring the output of the pump against predetermined values and setting off an alarm if the output volume decreases below a predetermined threshold. The alarm method utilizes a continuous measurement system whereby the time period required for the pump to decrease the volume in the tank from a high level to a low level is compared to a predetermined threshold. Thus, when the pump takes longer than predicted to empty the tank, a pump malfunction has occurred and an alarm is triggered. While this patent utilizes an alarm mechanism based upon time measurements it differs from the present invention in that it is used to monitor the performance of a pump, for how long it takes the pump to empty the tank. The alarm, unlike the present invention, does not monitor how often the tank is emptied nor whether a siphon is properly discharging fluid from a tank.

The Amici patent (U.S. Pat. No. 4,254,934) discloses a hydraulic siphon with a pneumatic reflux. This invention utilizes a push button to introduce gas into a syphon thereby breaking the hydrostatic equilibrium and causing the siphon to discharge. It is particularly intended for use in water closets. Thus, this invention does not encompass an automatic dosing siphon, nor an alarm system for monitoring the siphon's operation, nor an automatic restart mechanism for the siphon.

The Murata patent (U.S. Pat. No. 5,263,370) discloses a liquidometer utilized to measure small flow rates with high accuracy and resolution. This invention utilizes a siphon to discharge a sample liquid whenever a given capacity of a main reservoir is reached. An emission sensor on the outlet siphon counts the number of siphon emissions, whereby high accuracy measurements are accomplished for a reservoir with a small capacity. Clearly, this invention does not determine whether a siphon has failed, nor does it sound an alarm.

The Martin patent (U.S. Pat. No. 4,020,488) discloses a method of monitoring the performance of a process and determining whether a sensed parameter is beyond a predetermined limit. Specifically, this invention provides dual sensors for determining when a predetermined limit is exceeded, at which point an alarm or safeguard control operative is triggered. As currently envisioned this invention contemplates being used in boiler operations, temperature controlled plant operations, and other systems where a false alarm could shut down operations and would be extremely costly. This invention does not contemplate an alarm being used within a dosing siphon system for detecting excessive periods of siphon non-operation.

The Hazen patents (U.S. Pat. Nos. 3,881,506 and 3,797, 513) disclose a dosing siphon for use with livestock and poultry waste removal. These patents utilize a siphon similar to the present siphon, however, an alarm system for detecting siphon malfunction is not contemplated. Additionally, these patents identify a method for preventing the siphon from reaching equilibrium and not flushing. The specific method identified does not contemplate using a restart mechanism triggered upon the failure of the siphon to activate. Thus, while these patents utilize dosing siphons, they do not provide an alarm or a system for restarting the siphon. As a result the teaching of these patents do not apply to the invention herein disclosed.

The Andersson patent (U.S. Pat. No. 5,273,067) discloses a liquid dosing apparatus which utilizes a float to activate a siphon and drain a tank. While this patent discloses a siphon it does not provide for an alarm when the siphon fails to operate within a predetermined time period. Additionally, this patent does not contemplate a method of automatically restarting a siphon which has failed.

The Ball patent (U.S. Pat. No. 5,480,561) discloses a method of treating wastewater in a recirculating filter. Since this patent does not disclose a siphon nor an alarm for wastewater treatment system failure, it is not applicable to the invention which is herein disclosed.

The Ball patent (U.S. Pat. No. 4,439,323) discloses a method for filtering and discharging waste water from a septic tank. This patent prevents blockage of the fluid discharge apparatus by solids suspended in the waste water. While this patent is envisioned to operate with both pumps and siphons, it does not address the problems which the invention herein disclosed addresses, namely when a siphon system has failed. Additionally, this patent does not provide a method for restarting a siphon which has failed.

The O'Hair patent (U.S. Pat. No. 5,358,000) discloses a siphon used to pump water from a source to a supply destination. This patent does not depict an alarm nor a restart mechanism for the siphons which the present invention provides.

The George patent (U.S. Pat. No. 4,319,601) discloses a siphon apparatus for discharging liquid from a tank. This apparatus also contains a trigger mechanism which initiates discharge of the liquid when the liquid reaches a predetermined level. It also provides a method of ensuring the trap is refilled after each siphon operation, thereby ensuring the siphon has a liquid seal for its next cycle. While this invention ensures the siphon is always "primed" for the next cycle, this embodiment substantially differs from the invention herein disclosed. This patent does not provide an alarm system nor a restart system which operates upon detection of siphon failure. Thus, the cited patent provides one method for ensuring that a siphon is primed. A method which does not in any way encompass the invention herein disclosed.

The George patent (U.S. Pat. No. 4,625,752) discloses a siphon for use in flushing troughs. This siphon encompasses a "burp" tube which provides for the simultaneous flushing of multiple siphons across a wide trough. While this patent encompasses a siphon operation similar to that utilized in the invention herein disclosed, this patent does not provide for an alarm system or a method of restarting a siphon upon detection of it's failure.

This invention consists of a system for monitoring siphon performance and triggering an alarm when a siphon malfunction is detected. Additionally, two methods for restarting a siphon which has lost its prime are detailed.

Although a siphon alarm and restart mechanism can be utilized in any system which utilizes siphons for discharging fluids from a tank, for the sake of illustration, this application will be directed to sewage or waste water treatment systems. A dosing siphon is usually located within a tank used to collect waste water. The siphon is composed of a bell type cap, an inside the tank vent pipe, and a trap. The trays inlet is positioned within the bell. The siphon is activated upon the waste water reaching a high level in the tank. The siphon action forces the waste water through the trap, and out of the tank through a discharge pipe.

A siphon is a very reliable and simple method of discharging waste water from a tank, however, it is not fool proof. Sometimes a siphon will leak air, or take a "gulp" of air insufficient to break the siphon, and will end up trickling. To prevent this, the present invention places a flow detection switch or similar flow monitor in the outlet of the siphon. The normally closed flow detection switch opens upon a flushing of the tank by the automatic triggering of the siphon. Upon opening the switch a reset signal is sent to a relay.

Upon receiving the reset signal from the flow detection switch, the relay resets and begins counting down for a predetermined or preselected time period. When the siphon fails to re-activate within the predetermined time counted down on the relay, the relay activates an audible or visual alarm or both, thereby signaling a possible siphon failure. The alarm is only activated if the time from the last cycle of the siphon exceeds the set time of the relay.

In addition to an automatic dosing siphon alarm, this invention encompasses two methods for restarting a siphon without human interface for which this invention's flow alarm system has detected a fault. In the first restart method, a flow detect switch is placed in the outlet of the automatic dosing siphon as described above. The flow detect switch is connected to two "make-on-break" relays in series. Upon the activation of the automatic dosing siphon both relays are reset. Once the tank has been emptied, the flow detect switch closes, and a signal is sent to the first relay to begin counting down. After the first relay's time expires, instead of sounding an alarm, a signal is sent to both the second relay and a solenoid drain valve located in the tank below the level of the open end of the automatic dosing siphon vent pipe. Upon receipt of the signal from the first relay, the second relay begins to countdown for a second predetermined time period. Simultaneously, the solenoid drain valve inside the tank opens and allows fluid to drain from the tank into the trap and out the discharge outlet pipe. Fluid is drained from the tank until the fluid level in the tank is drained below the open end of the internal vent pipe. A float switch or similar method of determining the tank's fluid level is then activated. The float switch closes the solenoid drain valve, the automatic dosing siphon is reprimed, and the tank begins to refill. After the tank has refilled, the automatic dosing siphon activates and the flow detect switch sends a flow detect signal which resets both relays. It is important to note that while the solenoid drain valve is open, the flow detect switch is not activated and the second relay continues to countdown. The flow detect switch does not activate because the solenoid drain valve flow capacity is considerably less than the siphon's flow capacity. If the automatic dosing siphon does not activate within a pre-determined time after the fluid in the tank is drained via the solenoid drain valve, the second relay's countdown will elapse and an alarm will be triggered. Thus, an automatic dosing siphon with an automatic restart system is accomplished.

The second method of restarting the automatic dosing siphon upon the detection of a siphon failure before human interface is required, also, utilizes the above two relay configuration. However, instead of using a solenoid drain valve and a float switch to re-prime the siphon, an air pump is activated after the first relay's count-down has elapsed. The air pump pumps air under the siphon bell for a predetermined time period. The pressure under the siphon bell and in the trap is increased and the siphon is restarted. As in the above depiction of the auto-restart system, the second relay continues to count-down until the automatic dosing siphon is activated at which time the flow detect switch sends a flow detect signal which resets both relays. As above, if the second relay's count-down elapses an alarm is triggered.

BRIEF DESCRIPTION OF THE DRAWINGS

The accompanying drawings illustrate a complete embodiment of the invention according to the best mode so far devised for the practical application of the principles thereof, and in which.

DETAILED DESCRIPTION OF THE INVENTION

Figure 1:
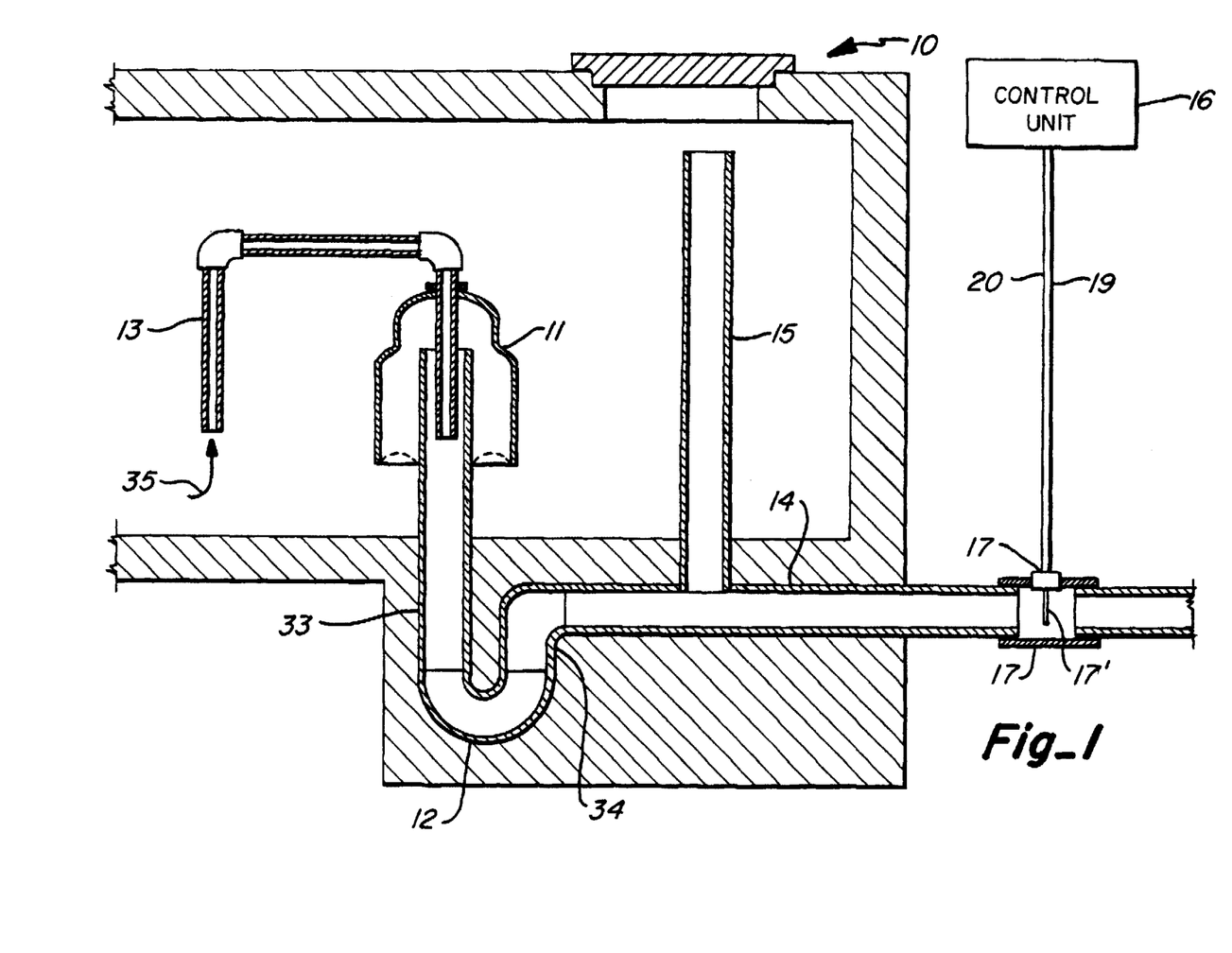
FIG. 1 is a schematic view of an automatic dosing siphon with an alarm system and a flow detect switch in the discharge outlet of a siphon in accordance with the present invention.

Turning now more specifically to the drawings, FIG. 1 shows a tank 10 which contains an automatic dosing siphon comprised of a siphon bell 11, long leg of the trap 33, trap 12, short leg of the trap 34, vent pipe 13, outlet discharge pipe 14, and an overflow pipe 15. The tray and outlet pipe constitute the discharge conduit. Also, shown in FIG. 1 is a control unit 16, a flow detect switch 17, and the leads 19, 20 from the switch 17.

Figure 2:
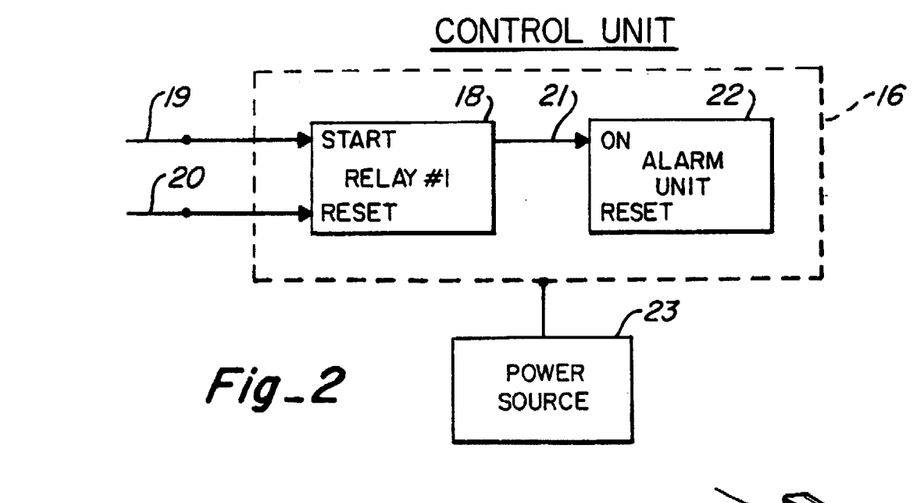
FIG. 2 is a block diagram of a control unit that illustrates the preferred siphon monitoring and failure signaling embodiment of this invention.

FIG. 2 shows a block diagram of the control unit 16 depicted in FIG. 1. The control unit 16 is comprised of a relay 18 which receives either a "NO FLOW" signal or a "FLOW DETECT" signal from the flow detect switch 17. The relay 18 provides an output 21 to an alarm unit 22. The alarm unit 22, relay 18, and flow detect switch 17 receive power from the power source 23.

Figure 3:
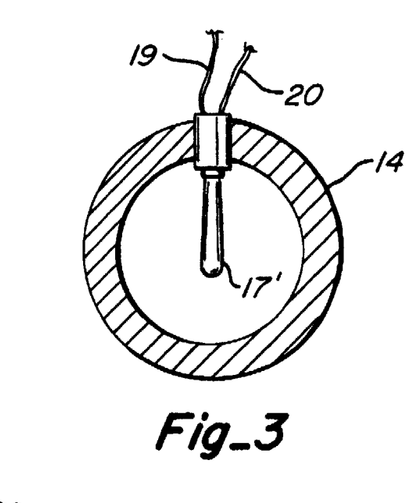
FIG. 3 is a cross-sectional view of the location of the flow detect switch within the siphon discharge outlet taken along line A—A of FIG. 4.

FIG. 3 exemplifies pictorially the location of the flow detect switch 17 within the outlet pipe 14. The flow detect switch 17 is positioned within the outlet pipe 14 in such a manner that a mere trickle through the outlet pipe 14 will not activate the flow detect switch 17.

Figure 4:
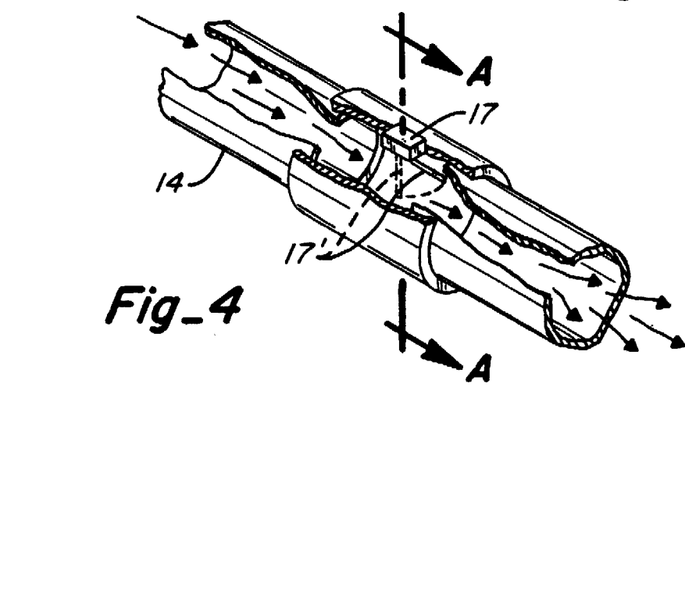
FIG. 4 is a schematic view of the flow detect switch of FIG. 2 in operation upon the emptying of the tank by the automatic dosing siphon.

The operation of this invention is as follows. After the tank 10 is successfully emptied by the activation of the automatic dosing siphon, the contacts on the flow detect switch 17 close, thereby sending a "NO FLOW" signal to the relay 18. The relay 18 begins counting down for a predetermined, selectable time period. While the relay 18 is counting down, the fluid level in the tank 10 begins to rise at the same rate in both the tank 10 and the siphon bell 11, while the siphon vents to the atmosphere through the open end 35 of the vent pipe 13. Once the fluid level inside the tank 10 and the bell 11 reach the open end 35 of the vent pipe 13, an air seal is created within the siphon bell 11 and the long leg of the trap 33. The fluid level in the tank 10 then begins rising at a rate greater then the fluid level within the bell 11. At the same time, the head of water in the tank 10 exerts pressure on the air trapped in the top of the bell 11 and the long leg of the trap 33. The air in the long leg of the trap 33 is forced towards the bottom of the trap 12. When the air reaches the bottom of the trap 12 it is forced up the short leg of the trap 34 and through the outlet pipe 14. The back pressure in the bell 11 is relieved, the siphon action is activated. The fluid in the tank 10 is drained through the bell 11, trap 12, and the outlet pipe 14. The forceful discharge of fluid through the outlet pipe 14 forces open the vane 17' and the contacts of the flow detect switch 17, which sends a "FLOW DETECT" signal to the relay 18 located within the control unit 16. The "FLOW DETECT" signal resets the relay 18. The relay 18 stays reset until the fluid level in the tank 10 decreases to the bottom level of the bell 11. At which time, the back pressure is relieved, the flow from the tank 10 ceases, the flow detect switch 17 closes, and sends a "NO FLOW" signal to the relay 18 in the control unit 16. FIG. 4 shows the pressurized fluid going through the outlet pipe 14 forcing open the vane 17' of the flow detect switch 17.

Upon receiving a "NO FLOW" signal the relay 18 begins counting down again. If the siphon does not activate and thereby open the contacts of the flow detect switch 17 within the relay 18 preselected time period, the relay 18 countdown elapses and a "TIME ELAPSED" signal is sent to an alarm unit 22. At this point operator interface is required to reset the alarm 22, the relay 18 and correct the potential siphon malfunction.

Figure 5:
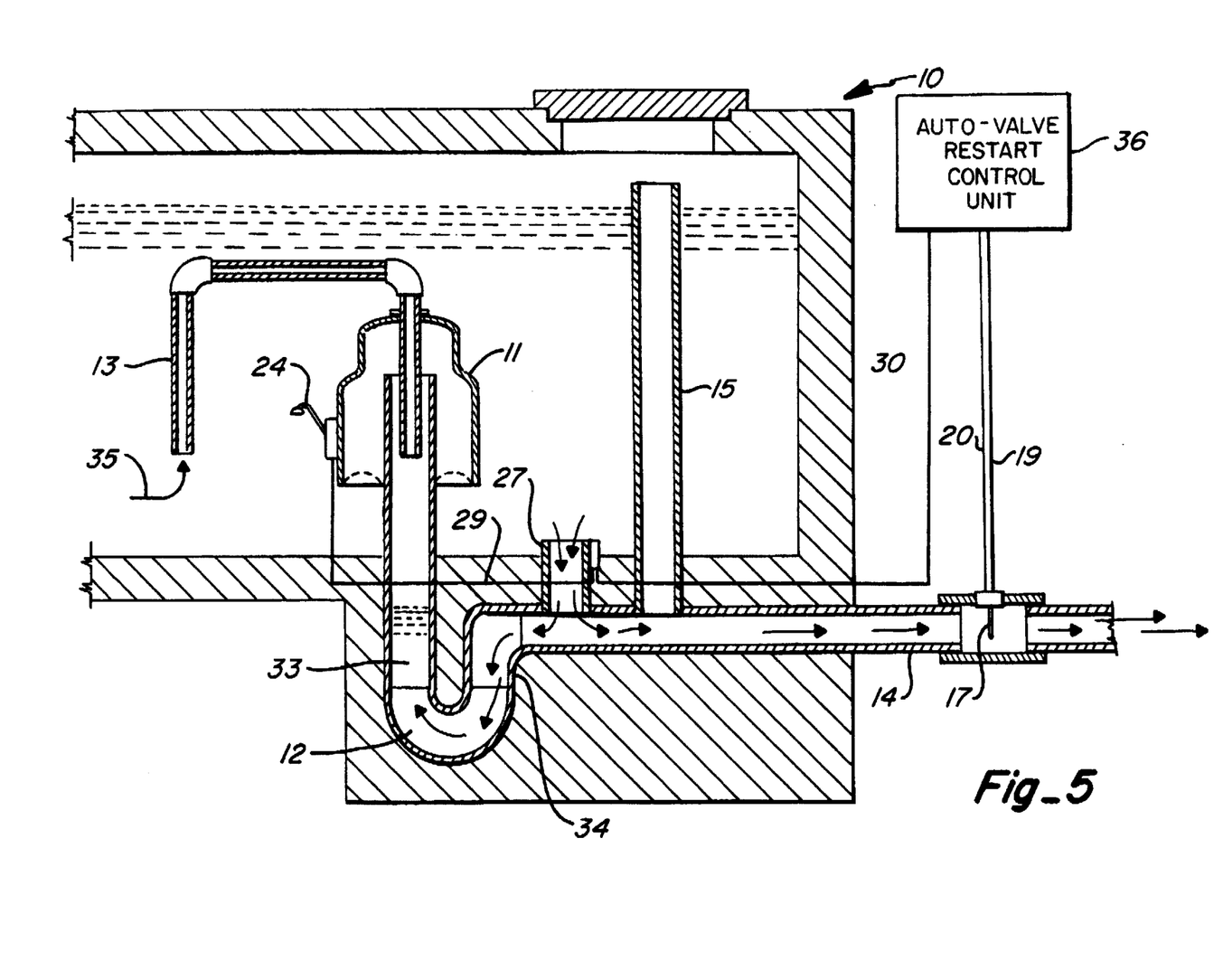
FIG. 5 is a schematic view of the automatic dosing siphon with the alarm system of FIG. 1 and a restart system utilizing a solenoid drain valve and a float switch.

FIG. 5 shows a second embodiment with the addition of an auto restart system to the first embodiment. Per the above description, an automatic dosing siphon is located within a tank 10. A flow detect switch 17 is located within the outlet pipe 14 connected to the siphon trap 12. The flow detect switch 17 sends signals to a control unit 36. Additionally, a float switch 24 can be connected to the side of the siphon bell 11. A solenoid controlled drain valve 27 is connected above the short leg of the trap 34, and a modified control unit 36 is added.

Figure 6:
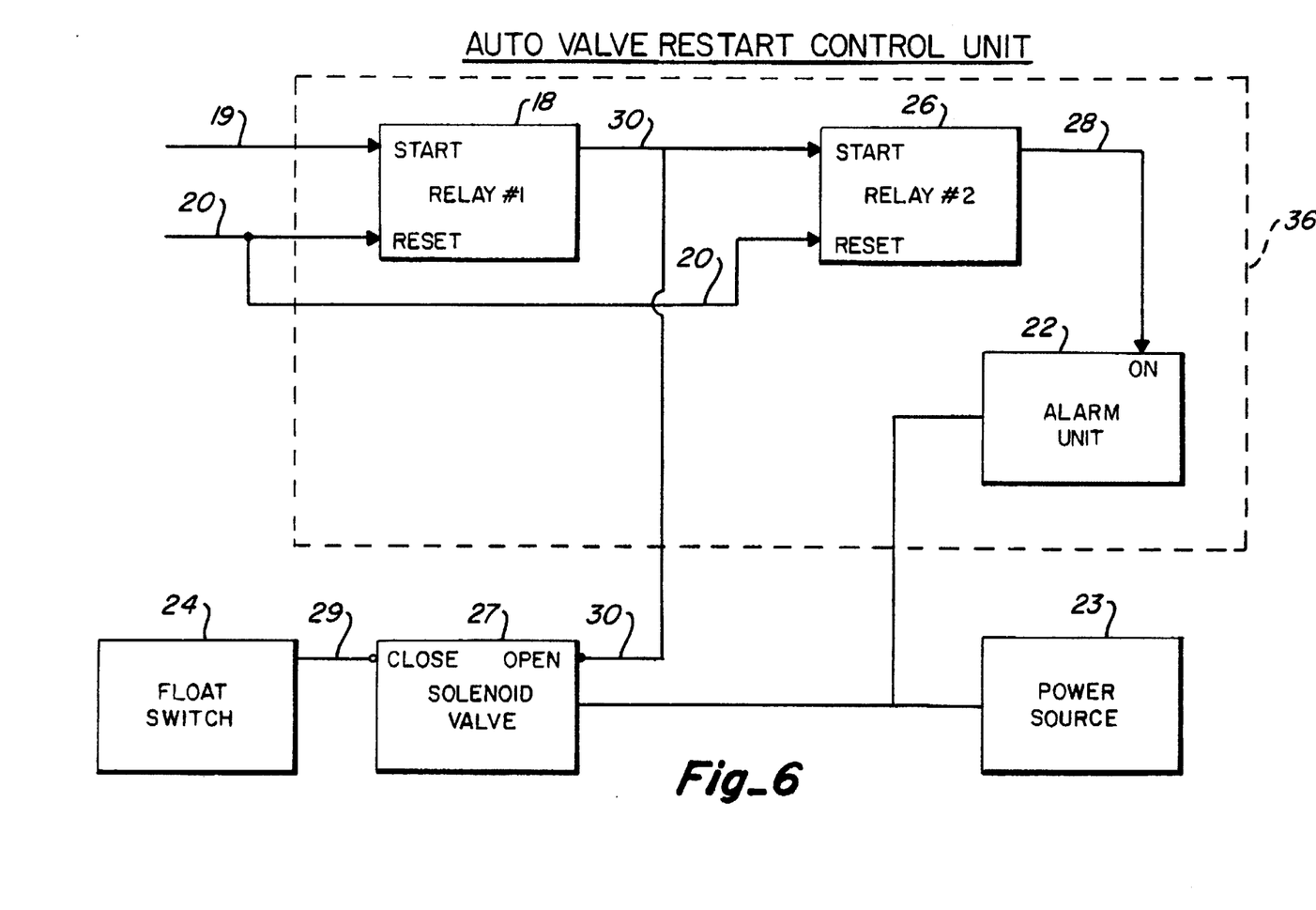
FIG. 6 is a block diagram of an auto valve restart control unit used to control the restart system of the automatic dosing siphon shown in FIG. 5.

FIG. 6 shows the modifications to the first control unit 16 shown in FIG. 2 which are necessary to embody this auto valve restart mechanism. For clarity purposes, the modified control unit, 36 as shown in FIG. 5 and 6, is called the "AUTO VALVE RESTART CONTROL UNIT." The modifications include: a second relay 26; a solenoid controlled drain valve 27; and, the necessary interfaces between the components, namely a lead 28 between relay #2 26 and the alarm unit 22, a lead 30 between relay #1 18, relay #2 26, and the solenoid controlled drain valve 27, and a lead 29 between the float switch 24 and the solenoid controlled drain valve 27.

Figure 7:
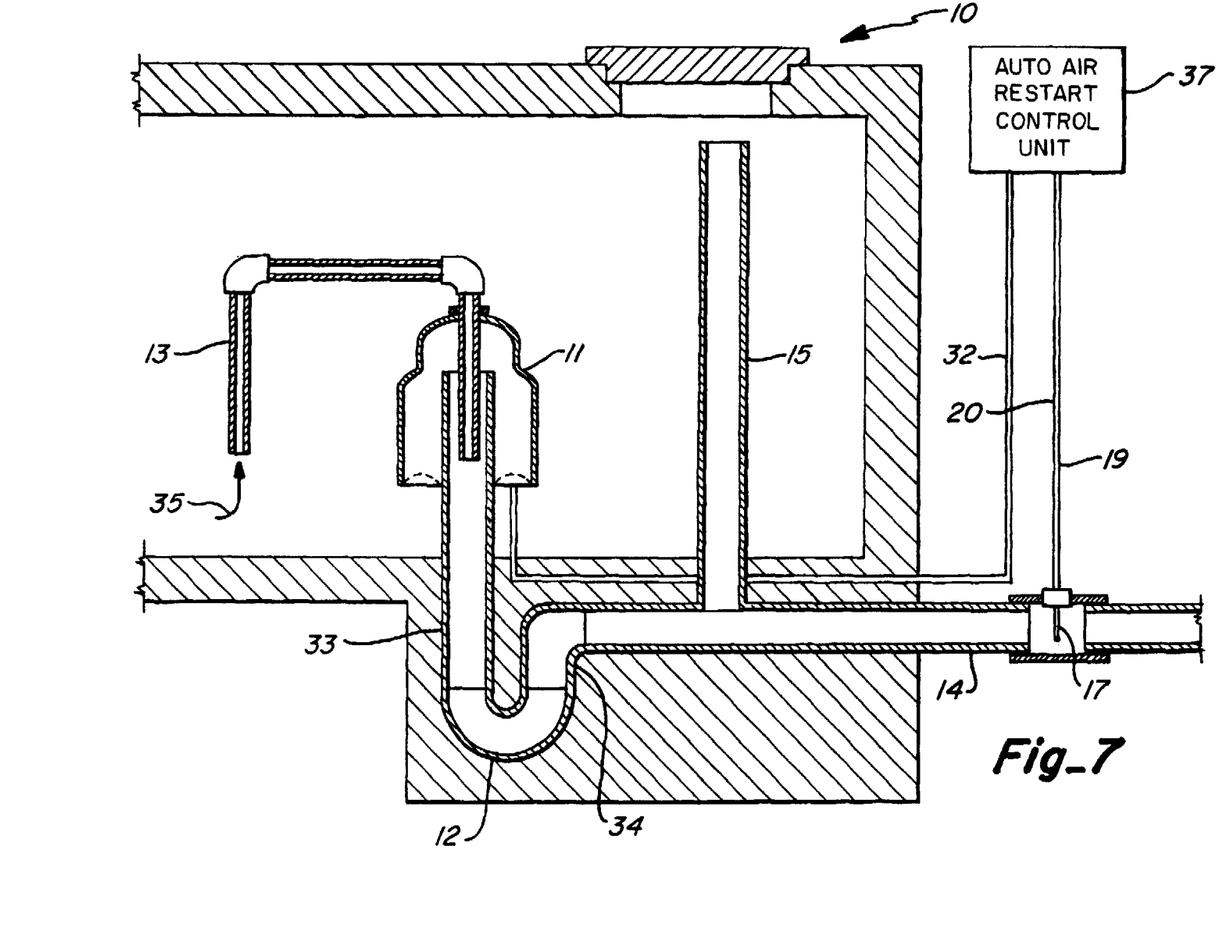
FIG. 7 is a schematic view of the automatic dosing siphon with the alarm system of FIG. 1 which utilizes an air pump to restart the siphon; and, FIG. 8 is a block diagram of an air pump restart control unit used to control the restart system of the automatic dosing siphon shown in FIG. 7.

The operation of this restart system is as follows. The basic operation of the automatic dosing siphon is as described above. However, once relay #1 18 completes its countdown, instead of sending a signal to trigger the alarm unit 22, relay #1 18 sends an "AUTO RESTART" signal on lead 30 to both the solenoid drain valve 27 and relay #2 26. Upon receiving the "AUTO RESTART" signal, relay #2 26 begins counting-down for a predetermined, selectable time period. Simultaneously, the solenoid drain valve 27 opens and begins to drain the tank 10. Once the tank 10 has been drained below the open end 35 of the air vent pipe 13, the float switch 24, as shown in FIG. 7, is at its low position. The float switch 24 sends a "CLOSE" signal on lead 29 to the solenoid drain valve 27, thereby terminating the draining of fluid from the tank 10. At this point, the bell 11 has been drained of fluid, the trap 12 volume is equalized in both the long leg 33 and short leg 34 of the trap, and the siphon is reprimed. Next, the tank 10 begins to refill and upon reaching the high level mark the siphon activates. The tank 10 is drained and fluid is forced through the outlet pipe 14, and past the flow detect switch 17. Next, the flow detect switch 17 sends a "FLOW DETECT" signal which resets both relay #1 18 and relay #2 26. If the siphon fails to activate after the tank 10 was drained via the solenoid drain valve 27, relay #2 26 continues to countdown. Upon the lapse of the countdown period, relay #2 26 sends a "TIME ELAPSED" signal which activates the alarm unit 22.

Figure 8:
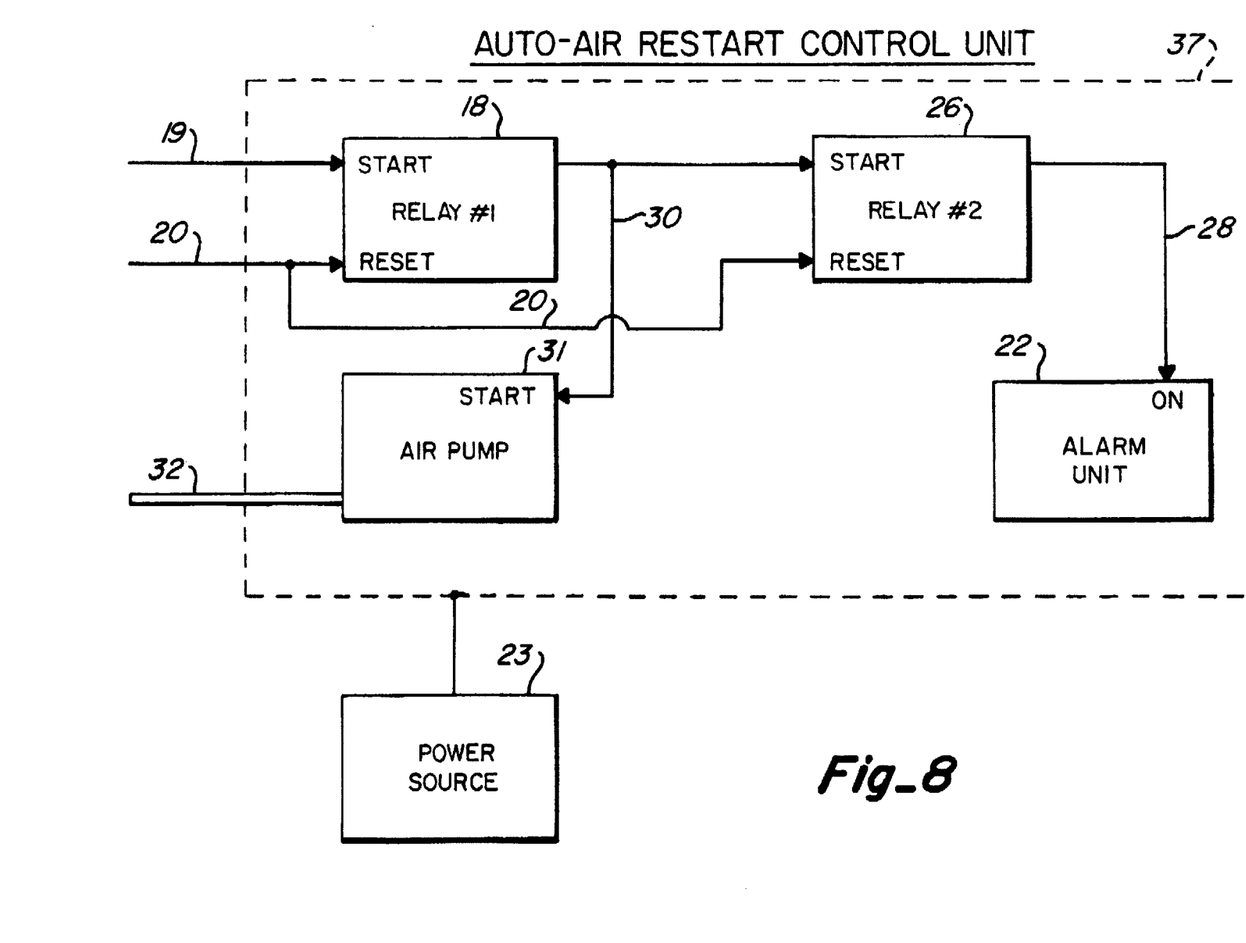

Another embodiment of an auto restart system is depicted in FIG. 7. Per the above description, an automatic dosing siphon is located within a tank 10. A flow detect switch 17 is located within the outlet pipe 14 connected to the siphon trap 12. The flow detect switch 17 sends signals to the control unit 37. FIG. 8 shows the modifications to the first control unit 16 shown in FIG. 2 which are necessary to embody this auto air pump restart embodiment. For clarity purposes, the latest modified control unit, 37 as shown in FIGS. 7 and 8, is called the "AUTO AIR RESTART CONTROL UNIT."

The "AUTO AIR RESTART CONTROL UNIT" 37 additionally contains: an air pump 31, relay #2 26, and, the necessary interfaces between the components, namely a lead 28 between relay #2 26 and the alarm unit 22, and the lead 30 between the output of relay #1 18 and relay #2 26 and the start input for the air pump 31. Also, from the air pump 31 an air line 32 is routed to the inside of the bell 11.

The operation of this embodiment of the restart system is as follows. Upon the lapse of the relay #1 18 countdown, the auto restart signal is sent to relay #2 26 and to the air pump 31. The air pump 31 pumps air into the bell 11 via the air hose 32 for a predetermined time period. The pumping of air into the bell 11 increases the water and air pressure within the bell 11, and the trap components, 12, 33, 34. Upon sufficient pressure being created within the bell 11 the air is forced down the long leg 33, thru the trap 12, and up the short leg 34 thereby initiating the siphon action. In the event pumping air into the bell 11 fails to activate the siphon, relay #2 26 continues to countdown and activates the alarm unit 22 upon the lapsing of its countdown.

It is to be understood that the components and control devices needed to produce these embodiments can be selected from units known in the control system industry, including but not limited to computerized control systems, programmable logic controllers, and other combinations of electronic controls and relays.

Although a reliable siphon alarm and restarting mechanisms have been shown and described in this application, it should be understood that this invention is not to be limited to the exact form disclosed, and changes in detail and construction of the invention may be made without departing from the spirit thereof.

What is claimed is:

1. A fluid discharge monitoring system which monitors the discharging of fluid from a reservoir having a bottom and a top portion utilized in a sewage treatment system such that in the event said discharge fails to occur notification of the failure can be given to an intended user, said system comprising:

a) a fluid discharge means which discharges fluid from a reservoir;

b) sensing means capable of determining when fluid within said reservoir has been discharged, and providing an output signal indicating that fluid within the reservoir has been discharged;

c) control unit connected to said sensing means and upon receipt of said output signal therefrom activating a timing system used for determining when the next discharge of fluid from said reservoir should occur, and providing an alarm signal when said discharge does not occur within the time determined by the timing system;

d) alerting means connected with said control unit which upon receipt of said alarm signal from said control unit activates a preselected device whereby an intended recipient can be quickly alerted that the discharging of fluid within said reservoir within the predetermined time has not occurred; and e) a power supply means providing electrical power to the sensing means, control unit, and alarm means.

2. The fluid discharge monitoring system of claim 1 wherein said fluid discharge means is accomplished by an automatic dosing siphon comprised thereof:

a) a bell compartment located within said reservoir above the bottom portion of said reservoir, said bell compartment having an upper end substantially closed and an open lower end in communication with the interior of said reservoir for receiving fluid from the interior of said reservoir;

b) a discharge conduit with an upper open end located within said bell compartment and extending downwardly, and outwardly through said reservoir;

c) a trap element within said discharge conduit to capture a quantity of fluid therein; and d) a venting conduit extending from a lower open end within said discharge conduit, upwardly through said bell compartment, and extending downwardly to an open end arranged at a height located within said tank and above the bottom portion of said bell compartment.

3. The fluid discharge monitoring system of claim 1 wherein said fluid discharge means is accomplished by a dosing siphon located within said reservoir and having a discharger pipe extending beyond the reservoir.

4. The fluid discharge monitoring system of claim 3 wherein said sensing means is accomplished by a flow detect switch located in the discharge pipe of said automatic dosing siphon, which upon the discharge of fluid from said reservoir provides a discharged output signal to said control unit, signaling that the fluid within said reservoir has been discharged.

5. The fluid discharge monitoring system of claim 3 wherein said control unit includes a make-on-break relay.

6. The fluid discharge monitoring system of claim 3 wherein said alerting means is a flashing strobe light.

7. The fluid discharge monitoring system of claim 3 wherein said alerting means is an audible alarm.

8. The fluid discharge monitoring system of claim 3 wherein said power supply is a 120 volt AC power supply.

9. The fluid discharge monitoring system of claim 3 wherein said power supply is a solar panel charged battery power supply.

10. An automatic dosing siphon monitoring system which monitors the performance of an automatic dosing siphon having an outlet pipe utilized in a sewage treatment system having a reservoir such that in the event said siphon fails to activate a discharge of fluid from the reservoir within a predetermined time period, notification can be given to an intended user, said system comprising:

a) a sensing means in said outlet pipe capable of determining when said automatic dosing siphon has activated, and providing a discharged output signal indicating when the siphon has activated;

b) a control unit connected to said sensing means and upon receipt of said discharged output signal therefrom activating a timing system used for determining when the next activation of the automatic dosing siphon should occur, and providing an alarm signal when said activation does not occur within the time determined by the timing system;

c) alerting means connected with said control unit which upon receipt of said alarm signal from said control unit activates a preselected device whereby an intended recipient can be quickly alerted that the automatic dosing siphon has failed to activate within a preselected time period; and d) a power supply means providing electrical power to the sensing means, control unit, and alarm means.

11. The automatic dosing siphon monitoring system of claim 10 wherein said sensing means is a flow detect switch located in the outlet pipe connected whereby upon the activation of the automatic dosing siphon and the rapid discharge of fluid from said reservoir the discharged output signal is sent to said control unit signaling that the fluid within said reservoir has been discharged.

12. The automatic dosing siphon monitoring system of claim 10 wherein said control unit includes a make-on-break relay.

13. The automatic dosing siphon monitoring system of claim 10 wherein said alerting means is a flashing strobe.

14. The automatic dosing siphon monitoring system of claim 10 wherein said alerting means is an audible alarm.

15. The automatic dosing siphon monitoring system of claim 10 wherein said power supply is a 120 volt AC power supply.

16. The automatic dosing siphon monitoring system of claim 10 wherein said power supply is a solar panel charged battery power supply.

17. An automatic dosing siphon monitoring and restart system which monitors the activity performance of an automatic dosing siphon utilized to discharge fluid from a reservoir, said system comprising:

a) an automatic dosing siphon having a discharge conduit;

b) a sensing means capable of determining when said automatic dosing siphon has activated and providing a discharged output signal;

c) an alternative fluid discharge means connected to said discharge conduit;

d) a control unit connected to said sensing means and upon receipt of said output signal activating a first timing system for a first predetermined time period, if said automatic dosing siphon does not activate within the first predetermined time period a time-out signal is provided to activate said alternative fluid discharge means and initiate a second timing system, if subsequent siphon activation does not occur within the second preselected time period an alarm signal is generated;

e) a fluid level detection means which upon the fluid level in said reservoir reaching a predetermined low level automatically terminates said alternative fluid discharge means;

f) alerting means connected with said control unit which upon receipt of said alarm signal activates a preselected device whereby an intended recipient can be quickly alerted that said automatic dosing siphon has failed to activate; and g) a power supply means providing electrical power to the sensing means, control unit, alternative fluid discharge means, alternative fluid discharge termination means, and alarm means.

18. The automatic dosing siphon monitoring and restart system of claim 17 wherein said automatic dosing siphon is comprised thereof:

a) a bell compartment located within said reservoir above the bottom portion of said reservoir, said bell compartment having an upper end substantially closed and an open lower end in communication with the interior of said reservoir for receiving fluid from the interior of said reservoir;

b) a discharge conduit with an upper open end located within said bell compartment extending downwardly and outwardly from said reservoir;

c) a trap element within said discharge conduit to retain a quantity of fluid therein; and d) a venting conduit extending from a lower open end within said discharge conduit upwardly through said bell compartment and downwardly to an upper open end located within said reservoir and at a height outside and above the bottom portion of said bell compartment.

19. The automatic dosing siphon monitoring and restart system of claim 17 wherein said sensing means is a flow detect switch located downstream in the outlet discharge conduit whereby the switch upon the activation of the automatic dosing siphon and the rapid discharge of fluid from said reservoir provides a discharged output signal to said control unit.

20. The automatic dosing siphon monitoring and restart system of claim 17 wherein said control unit includes two relays connected in series.

21. The automatic dosing siphon monitoring and restart system of claim 17 wherein said alternative fluid discharge means includes a solenoid drain valve positioned in the reservoir and arranged to drain the reservoir into said discharge conduit, said solenoid drain valve is positioned above said automatic dosing siphon trap such that opening of said drain valve allows fluid to drain from the reservoir at a fluid flow rate which will reprime said trap while not triggering said sensing means.

22. The automatic dosing siphon monitoring and restart system of claim 17 wherein said fluid level detection means is a float switch mounted within said reservoir so that upon draining of fluid within said reservoir to a level below the opening of the upper end of the vent pipe a signal is sent to said drain valve means, thereby closing the valve means and terminating the discharge of fluid from said reservoir.

23. An automatic dosing siphon monitoring and restart system which monitors the performance of an automatic dosing siphon utilized to discharge fluid from a reservoir in a sewage treatment system upon the fluid within said reservoir reaching a predetermined high level, in the event said automatic dosing siphon fails to activate a discharge of fluid from said reservoir within a first predetermined time period, the system activates a second time period and a restarting device to restart said automatic dosing siphon and monitors the operation of said siphon so that if the dosing siphon fails to activate a discharge of fluid from said reservoir within said second time period a restart alert notification can be given to an intended user, said system comprising:

a) an automatic dosing siphon having a discharge conduit;

b) a sensing means capable of determining when said automatic dosing siphon has activated, and providing a discharged output signal;

c) an automatic dosing siphon re-start means;

d) a control unit connected to said sensing means and upon receipt of said discharged output signal activating a first timing system for a preselected time period; if said automatic dosing siphon does not activate within the first preselected time period a restart signal is generated to initiate said siphon restart means and initiate a second timing system for a second preselected time period to determine by when the re-priming and subsequent activation of said automatic dosing siphon should occur, if the subsequent activation does not occur within the second preselected time period an alarm signal is generated;

e) said restart means being arranged to attempt a restart of the dosing siphon upon receipt of the restart signal from the control unit that the siphon did not operate during the first preselected time period;

f) an alerting means connected with said control unit which upon receipt of said alarm signal activates an alerting device whereby an intended recipient can be quickly alerted that the automatic dosing siphon has failed to activate; and g) a power supply means providing electrical power to the sensing means, control unit, restarting means, and alert means.

24. The automatic dosing siphon monitoring and restart system of claim 23 wherein said automatic dosing siphon is comprised thereof:

a) a bell compartment located within said reservoir above the bottom portion of said reservoir, said bell compartment having an upper end substantially closed and an open lower end for receiving fluid from the interior of said reservoir;

b) said discharge conduit having an upper open end located within said bell compartment and extending downwardly and outwardly through said reservoir;

c) a trap element within said discharge conduit to capture a quantity of fluid therein; and d) a venting conduit extending from a lower open end within said discharge conduit, upwardly through said bell compartment, and extending downwardly to an open end arranged within said reservoir and at a height above the bottom portion of said bell compartment.

25. The automatic dosing siphon monitoring and restart system of claim 24 wherein said sensing means is a flow detect switch located downstream in the discharge conduit; said flow detect switch provides a discharged output signal to said control unit signaling that the fluid within said reservoir has been discharged.

26. The automatic dosing siphon monitoring and restart system of claim 24 wherein said control unit includes two relays connected in series.

27. The automatic dosing siphon monitoring and restart system of claim 24 wherein said restart means is an air pump means which is activated upon the count-down of the first timing system, said air-pump means pumps air into said siphon bell compartment for a predetermined time period so as to force the restart of said automatic dosing siphon.

* * * * *